(12) United States Patent
Nielsen

(10) Patent No.: US 7,599,452 B2
(45) Date of Patent: Oct. 6, 2009

(54) METHOD AND SYSTEM FOR APPLYING VITERBI TYPE PSK DEMODULATION FOR OPTIMUM CORRELATION OF GPS SIGNALS

(75) Inventor: Jorgen S. Nielsen, Calgary (CA)

(73) Assignee: Research In Motion Limited, Waterloo, ON (CA)

( * ) Notice: Subject to any disclaimer, the term of this patent is extended or adjusted under 35 U.S.C. 154(b) by 616 days.

(21) Appl. No.: 10/534,735

(22) PCT Filed: Nov. 27, 2002

(86) PCT No.: PCT/CA02/01843

§ 371 (c)(1),
(2), (4) Date: May 12, 2005

(87) PCT Pub. No.: WO2004/049663

PCT Pub. Date: Jun. 10, 2004

(65) Prior Publication Data

US 2006/0034350 A1 Feb. 16, 2006

(51) Int. Cl.
*H04L 27/06* (2006.01)

(52) U.S. Cl. ............ 375/341; 375/150; 375/324; 375/325; 375/329; 375/330; 375/331; 375/332; 375/342; 375/343

(58) Field of Classification Search .......... 375/265, 375/316, 329–332, 341, 342–343, 150, 324–325
See application file for complete search history.

(56) References Cited

U.S. PATENT DOCUMENTS

| | | | | |
|---|---|---|---|---|
| 5,237,587 A | * | 8/1993 | Schoolcraft | 375/150 |
| 5,353,278 A | * | 10/1994 | Murakami et al. | 720/721 |
| 5,375,129 A | * | 12/1994 | Cooper | 714/795 |
| 5,448,600 A | * | 9/1995 | Lucas | 370/342 |
| 5,654,667 A | * | 8/1997 | Adachi | 329/306 |
| 5,832,041 A | * | 11/1998 | Hulyalkar | 375/340 |
| 5,872,801 A | | 2/1999 | Mobin | |
| 6,356,595 B1 | * | 3/2002 | Czaja et al. | 375/262 |

(Continued)

OTHER PUBLICATIONS

Bruno et al., "Design and Evaluation of a Soft Output Viterbi Algorithm (SOVA) for use in a Concatenated Coding Scheme", (Oct. 16, 2001).*

(Continued)

*Primary Examiner*—David C Payne
*Assistant Examiner*—Sophia Vlahos
(74) *Attorney, Agent, or Firm*—Moffat & Co.

(57) ABSTRACT

A method and system of improving sensitivity in the demodulation of a received signal over an arbitrary measurement time epoch, the method comprising the steps of: correlating the received signal in a coherent fashion (80); and utilizing a Viterbi phase state keying trellis demodulation with a variable resolution of phase states over 360° to demodulate the radio frequency phase trajectory of the signal throughout the measurement time epoch (70); and the system comprising a receiver for receiving a direct sequence spread spectrum signal, the receiver comprising: an antenna (10) for receiving the direct sequence spread spectrum signal; a downconverter (40) for downconverting the received signal, producing a downconverted signal; an analog to digital converter (60) to convert the downconverted signal to a digital signal; a despreader (80) for despreading and coherently correlating the digital signal to a known signal, creating a despread signal; and a processor (70) for applying a Viterbi algorithm to the despread signal.

23 Claims, 5 Drawing Sheets

U.S. PATENT DOCUMENTS

| | | | |
|---|---|---|---|
| 6,370,201 B1 * | 4/2002 | Abbaszadeh et al. | 375/262 |
| 6,404,801 B1 * | 6/2002 | Lennen | 375/134 |
| 6,477,208 B1 * | 11/2002 | Huff | 375/265 |
| 6,633,615 B1 * | 10/2003 | Pekarich et al. | 375/265 |
| 6,721,366 B1 * | 4/2004 | Van Stralen | 375/262 |
| 6,940,927 B2 * | 9/2005 | Van Stralen | 375/340 |
| 7,120,207 B2 * | 10/2006 | Nordman | 375/341 |
| 7,154,965 B2 * | 12/2006 | Zeng et al. | 375/340 |

OTHER PUBLICATIONS

Mutsumu Serizawa et al.: Phase-Tracking Viterbi Demodulator Electronics & Communications, Scripta Technica/ New York, US vol. 79, No. 1, 1996, pp. 82-96.

* cited by examiner

METHOD AND SYSTEM FOR APPLYING VITERBI TYPE PSK DEMODULATION FOR OPTIMUM CORRELATION OF GPS SIGNALS

FIELD OF THE INVENTION

The present invention relates to a method and system for increasing the sensitivity of the demodulation of direct-sequence spread spectrum modulated-signals and more particularly to the application of a Viterbi demodulation type algorithm to the output of a coherent correlation of a GPS C/A L1 signal to improve the demodulation sensitivity.

BACKGROUND TO THE INVENTION

Due to Federal Communications Commission (FCC) requirements for identifying mobile phone location, vendors are beginning to incorporate global positioning system (GPS) receivers into their handsets. This is an assisted form of GPS where the host base station provides key search parameter information to the handset such that the GPS satellite search and subsequent delay measurement becomes significantly less computationally extensive for the handset. In the code-division multiple access (CDMA) context, the messaging between the base station and the handset to support the assisted GPS (AGPS) is documented in "Position Determination Service Standards for Dual Mode Spread Spectrum Systems," TIA/EIA/IS-801-1, published by the Telecommunications Industry Association (TIA).

In order for mobile location to be successfully based on AGPS, it is necessary that the GPS receiver in the handset unit have significantly higher sensitivity than is nominally required in a typical stand alone GPS unit. The reason is that the handset unit is usually oriented in positions or in locations that are not favorable for GPS signal reception. Hence a signal to noise ratio (SNR) sensitivity target is typically around 17 dB-Hz. Given that the GPS Coarse/Acquisition (C/A) L1 band which is typically used for mobile position location has a bandwidth of about 2 MHz, this implies that the input raw GPS, prior to processing, is more than 40 dB below the thermal noise floor.

There is also a significant push to drive the cost of the overall handset down which limits the quantity of the processing which can be done on the received GPS signals to extract them from the noise. This also limits the quality of the various radio frequency (RF) oscillator components used in the handset's receiver. Consequently, it can be expected that there will be some additional local oscillator (LO) noise that needs to be compensated for. Notably, there is no closed automatic frequency correction (AFC) loop possible during the GPS measurement as the input SNR is too low. The lack of AFC, and the use of low cost, low power, RF LO components, implies that there will Inevitably be a significant finite offset, drift, and some instability associated with the LO down conversion frequency.

The C/A signal from a GPS SV (space vehicle) is a DS-SS (direct sequence spread spectrum) with a chip rate of 1.023 Mcps. It is modulated as binary phase shift keying (BPSK) on a 1.574 GHz carrier. The GPS receiver correlates the received signal with a locally generated DS-SS code signal. In the AGPS scheme, traditional DS-SS correlation is also done. However, detailed information regarding the doppler shift of the SV GPS signal and code offset is available from the host base station (BS) which significantly reduces the search and detection effort. Nevertheless, the mobile GPS receiver is still required to determine the code delay and doppler to a finer resolution than that available from the host BS such that mobile location is possible.

Based on standard assumptions regarding the noise in the GPS signal channel, the optimum receiver would correlate the signal in a coherent fashion over an integration time period that is sufficiently long to provide about 11 dB SNR at the correlator output. This will typically provide an adequate probability of detection with a reasonable false alarm rate. However, in the case of a mobile GPS receiver, due to the instability of the RF LO and the uncertainty of the SV doppler, the coherent integration epoch needs to be limited. Also valid GPS readings are still required even if the user does not hold the receiver steady. Hence, typically the coherent integration time is limited to 10 msec or less. As the available coherent integration epoch is not sufficient to obtain the sensitivity required, non-coherent summations of sequential coherent correlation. Integration outputs are used. However, non-coherent processing is a very inefficient means of further enhancing the SNR of a signal as it discards certain known statistical aspects of the signal.

Various examples of the use of Viterbi algorithms for phase trajectory determinations are known. For example U.S. Pat. No. 6,477,208 to Huff teaches a method and apparatus for processing a received digitally-modulated carrier signal to coherently demodulate a signal utilizing a composite trellis diagram. However, the method of Huff is only applicable to cases of discrete jumps in phase based on specific modulations. When using a continuous, free running oscillator, the phase steps are continuous in time. Huff does not teach a method for approximating these phase steps.

SUMMARY OF THE INVENTION

The method and system of the present invention overcome the above by providing a way to demodulate the RF phase trajectory of a DS-SS correlation, using coherent integration for a measurement epoch of arbitrary duration. The receiver in the present invention downshifts an incoming signal using a local oscillator. The receiver then despreads the signal.

In a perfect system the output from the despreader would be a DC signal. However, due to frequency and phase instabilities in the radio frequency local oscillator, and due to uncertainty of the GPS SV doppler, the phase trajectory is generally a time varying phasor.

In order to provide increased sensitivity, a trellis is created with a fixed number of phase states evenly distributed between zero and 360°. The state transitions in the trellis are limited based on known phase slew rate limitations. Probabilities for these state transitions are similarly based on these same factors.

A Viterbi algorithm is then applied to the phase of the despread signal. Likelihood metrics are created for each path based on the phase of the despread signal as well as path probabilities. The system and method then uses the Viterbi algorithm to find the highest likelihood path for the phase trajectory through the trellis.

The present invention therefore provides a method of improving sensitivity in the demodulation of a received signal over an arbitrary measurement time epoch, said method comprising the steps of: correlating said received signal in a coherent fashion; and utilizing a Viterbi phase state keying trellis demodulation with a variable resolution of phase states over 0 to 360° to demodulate the radio frequency phase trajectory of said signal throughout the measurement time epoch.

The present invention further provides a method of increasing sensitivity of a receiver for direct-sequence spread spectrum signals, said method comprising the steps of: downconverting the direct-sequence spread spectrum signal; despreading the downconverted signal creating a despread signal with a radio frequency phase trajectory; and applying a Viterbi algorithm to the despread signal to determine the radio frequency phase trajectory, whereby the algorithm has the steps of: defining a number of possible states, each state corresponding with a discrete phase and all the states together creating an even distribution of phases between zero and 360°; creating possible state transitions from each state; setting the probability of a given state transition occurring; defining a trellis with paths based on the possible state transitions at a number of discrete time intervals; taking a sample of the despread signal at a number of discrete time intervals; creating a likelihood metric for each path based on the phase trajectory of the despread signal at the time interval of the path; discarding all paths entering a state except for the path with the highest likelihood metric entering the state; and determining the most likely radio frequency phase trajectory based on the paths not discarded.

The present invention still further provides a receiver for receiving a direct sequence spread spectrum signal, said receiver comprising: an antenna for receiving the direct sequence spread spectrum signal; a downconverter for downconverting the received signal, producing a downconverted signal; an analog to digital converter to convert the downconverted signal to a digital signal; a despreader for despreading and coherently correlating the digital signal to a known signal, creating a despread signal; and a processor for applying a Viterbi algorithm to the despread signal.

BRIEF DESCRIPTION OF THE DRAWINGS

Preferred embodiments of the present invention will now be described in greater detail and will be better understood when read in conjunction with the following drawings in which.

DETAILED DESCRIPTION OF THE DRAWINGS

In this disclosure, a system and method are described that provide a practical way of performing an optimal correlation of the DS-SS GPS signal using the known statistical properties of the signal. In particular, the method makes use of the generally known slew rate limitation of the LO instability and SV doppler.

The main aspect of the method is a Maximum Likelihood Viterbi procedure similar to the processing used in trellis decoding of standard PSK communication signals. Although the method is applied exclusively to GPS signals in the following disclosure, one skilled in the art will realize that the method is also applicable for precision tracking of CDMA pilot signals for applications of high sensitivity mobile position location.

Figure 1:
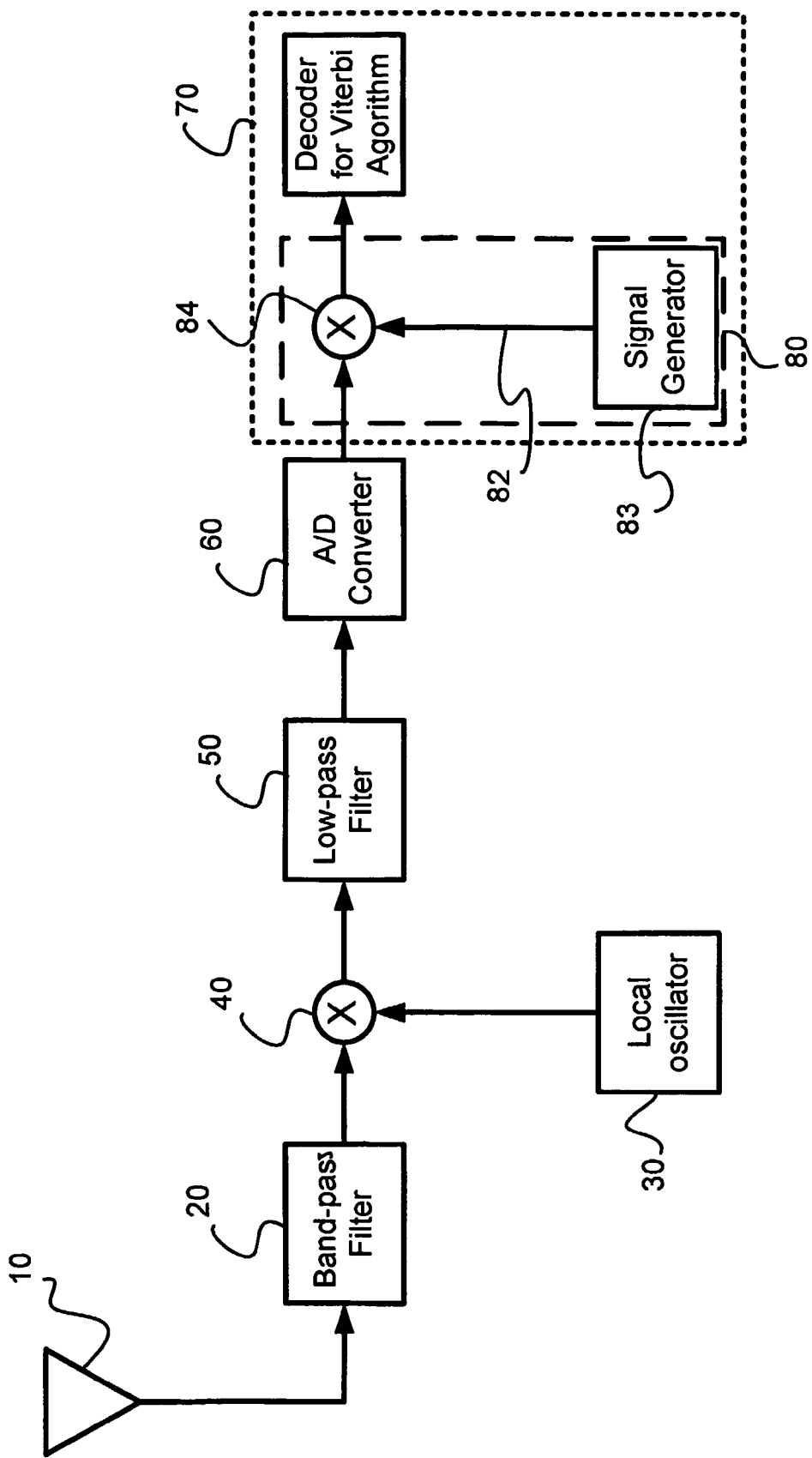
FIG. 1 is a schematic diagram of the receiver of the present invention.

Reference is now made to FIG. 1. The antenna 10 of a receiver 1 receives a direct sequence spread spectrum signal. The signal is then passed through band-pass filter 20 to isolate the signal. In a preferred embodiment, band-pass filter 20 is centred at 1.574 Ghz, which is the frequency of the GPS C/A L1 carrier.

The output from band-pass filter 20 is then downconverted by multiplying it with the signal from the radio frequency local oscillator 30 in multiplier 40, producing a baseband signal. This baseband signal is then passed through low-pass filter 50 and an analog to digital converter 60 to create a spread spectrum digitized signal.

The spread spectrum digitized signal is then passed through a digital signal processor 70. Digital signal processor 70 is comprised of a despreader 80 and a processor 90. Despreader 80 is comprised of multiplier 84 and signal generator 83 which generates coarse acquisition LI signal 82 which is multiplied with the spread spectrum digitized signal.

In a perfect system, the output from despreader 80 would be a DC signal. However, due to frequency and phase instabilities in local oscillator 30, and due to uncertainty of the GPS SV doppler, the phase trajectory is generally a time varying phasor. The output of despreader 80 is thus processed by processor 90, which applies a Viterbi algorithm as described below.

Consider the total GPS signal measurement time epoch, denoted by $T_{tot}$ as being divided into K equal length segments of $T_c$ each. It is assumed that the GPS correlator will coherently integrate for each of the segment lengths $T_c$ resulting in K correlation samples $X=[x_1, x_2, \ldots, x_K]^T$. It is also assumed that $T_c$ is short enough such that uncertainties in GPS doppler, RF LO offset or frequency/phase instabilities of the RF LO are such that the resulting signal loss in the coherent correlation output samples in X is not significant. Typically $T_c$ will be somewhere between 1 to 10 msec.

Figure 2:
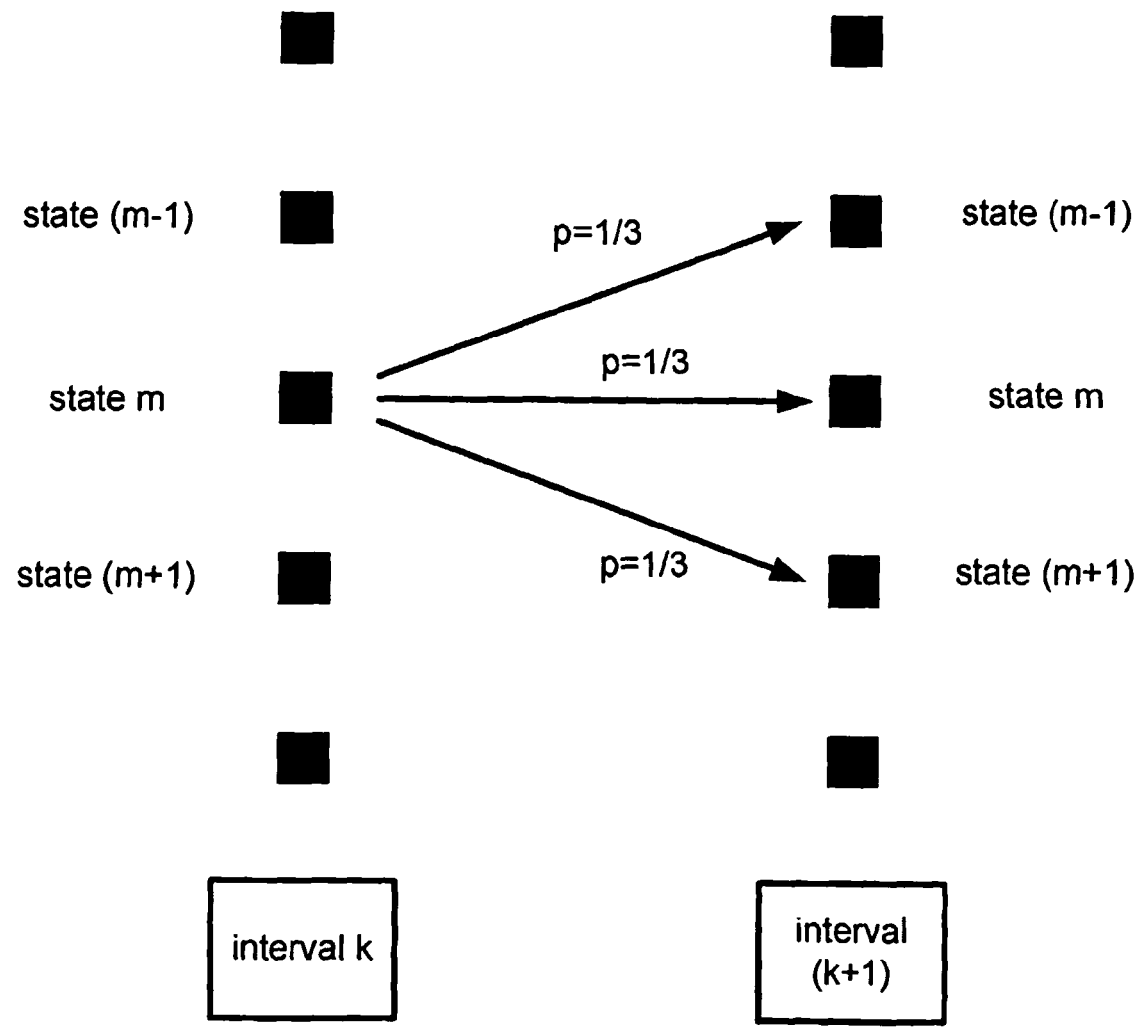
FIG. 2 is an example trellis diagram for use with the method of the present invention.

$X=[x_1, x_2, \ldots, x_K]^T$ is mapped into corresponding sample phases denoted by $P=[p_1, p_2, \ldots, p_K]^T$. These phases will be uniformly distributed between 0 and 360°. In order to implement a practical Viterbi algorithm, discrete phases are defined as being uniformly spaced such that:

M=number of discrete phases $s_0, s_1, \ldots s_{M-1}$ are the discrete phase states given by $s_n=(m/M) 360°$ Let k denote the $k^{th}$ state interval corresponding to the $k^{th}$ sample time or $x_k$. Reference is now made to FIG. 2, which shows an example trellis diagram for better illustration of the following description.

Consider the $m^{th}$ state of the $k^{th}$ interval. If there are no phase dynamics due to the RF LO or doppler, then it will map into state m of the $(k+1)^{th}$ interval with a probability of 1. However, due to the uncertainty in the phase dynamics, the $m^{th}$ state can map into state (m-1), m, (m+1) of the $(k+1)^{th}$ interval. Clearly, with these trellis state transition probabilities, the modeled slew rate of the phase dynamics can be accurately limited.

Figure 3:
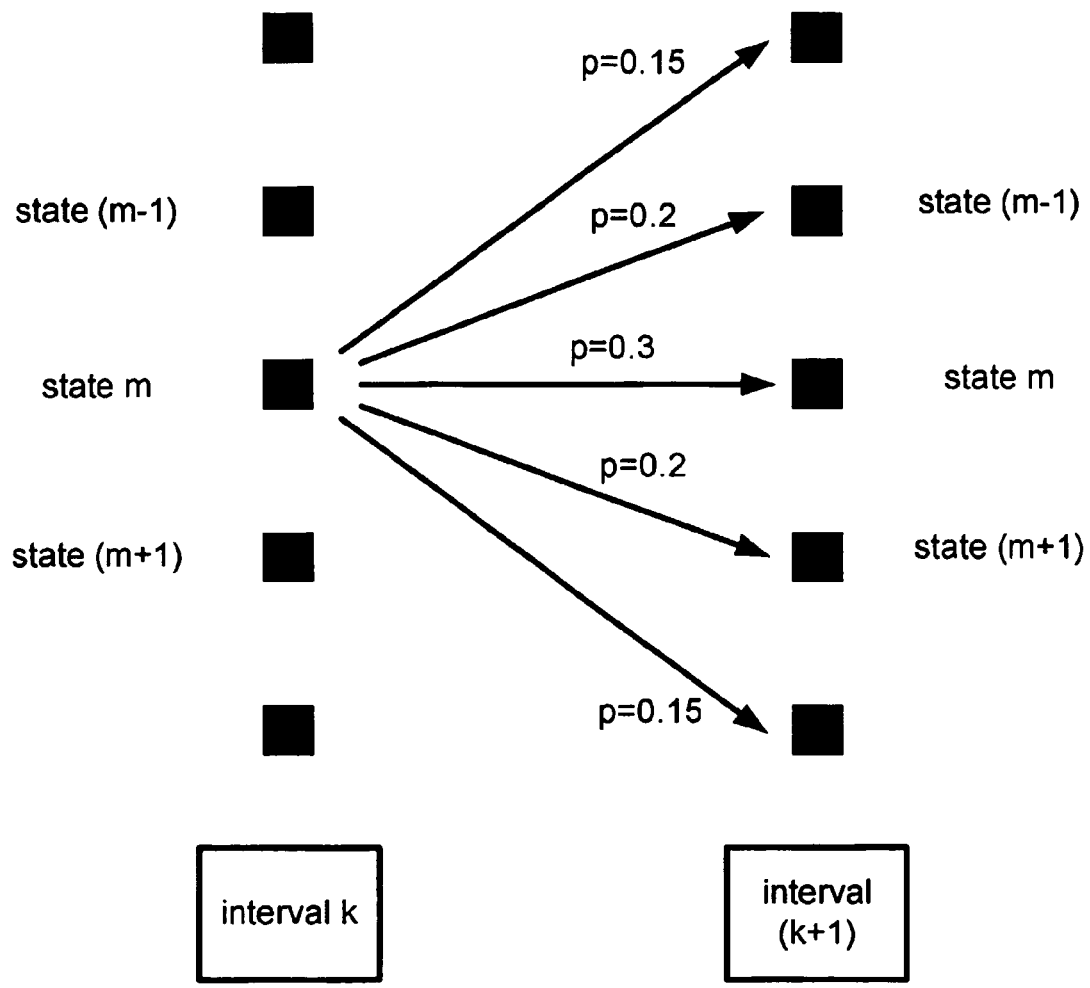
FIG. 3 is an alternative trellis diagram for use with the method of the present invention.

The trellis of FIG. 2 is only one example. One skilled in the art will realize that other trellis state transition probabilities are possible, and that a probability trellis can be created to more accurately model these other probabilities. For example, in FIG. 3, a system is illustrated in which the slew rate can be higher but a lower probability is assigned to higher slew rates.

Intuitively such slew rate limiting lattice structures as described above effectively "low pass filter" the phase samples to reduce the influence of noise in correlation samples X.

The number of phase states, "M", is a function of the phase resolution required. If M is too small then there will be a small demodulation loss due to the discrete phase quantization.

At each update, the standard Viterbi algorithm is used to eliminate the trellis paths of lower likelihood. (A good description of the Viterbi algorithm is found in "Digital Communications" by J. Proakis, McGraw Hill, $3^{rd}$ edition 1995.) Briefly, at the $k^{th}$ update a finite number of paths converge onto each of the M trellis phase states. For example, in the trellis structure of FIG. 2, there are three candidate paths and in the trellis structure of FIG. 3, there are five such paths. Each of these paths will have a likelihood metric associated with it. The path selected for each path is the one associated with the highest likelihood. Consequently, at each interval step, P paths converge to each trellis state and subsequently P new path segments are generated, as shown in the above examples for the $(k+1)^{th}$ trellis interval.

The measured samples, $p_k$, are the phases of the complex correlator outputs $x_k=x_{ik}+ix_{qk}$ as determined by:

$$p_k=\operatorname{atan}(x_{qk}/x_{ik}).$$

Figure 4:
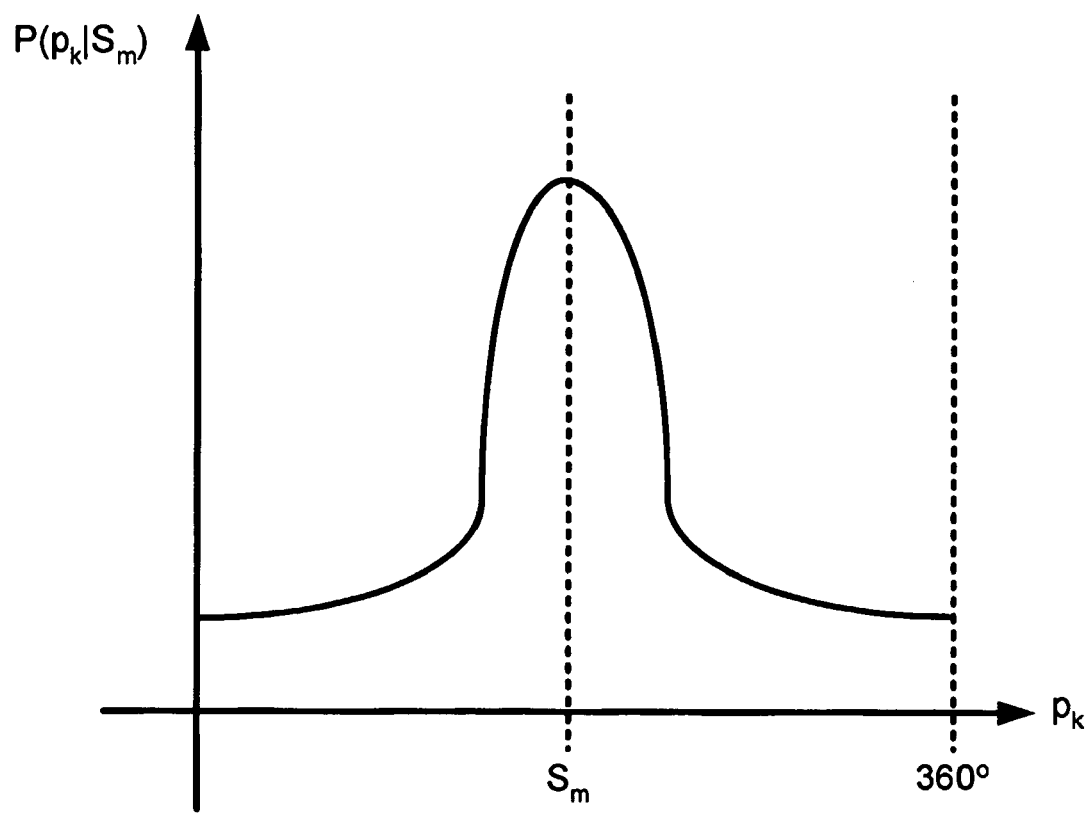
FIG. 4 is a graph illustrating an approximation of the probability distribution function of a phase sample as a periodic gaussian pulse on top of a constant function.

This is an example only as there are a variety of numerical methods of extracting the phase from $x_k$. In order to update the likelihood metric for each surviving path at the $k^{th}$ trellis interval, an estimate of probability of the received phase being $p_k$ conditioned on the phase state and the trellis path corresponding to the particular candidate path being considered is required. As the SNR of the correlator outputs, $x_k$, is typically low (usually less than 0 dB), the probability distribution function (PDF) of the phase sample $p_k$ is not gaussian. Also the phase trajectory is dependent in a complicated statistical way on the candidate trellis path being considered. Consequently, finding the actual conditional probability is impractical. However, there are several assumptions and approximations that can be reasonably made that significantly simplify the likelihood probability metric. These are:

1. Model the phase random process as first order Markov
2. Approximate the PDF of $p_k$ as a periodic gaussian pulse on top of a constant function as illustrated in FIG. 4.

Given this approach, the conditional probability metric can be approximated as $(p_k-S_m)^2$ where $S_m$ represents the assigned phase of the $m^{th}$ state. The influence of the constant portion of $P(p_k|S_m)$ is irrelevant as it is added to each candidate trellis path and therefore does not result in a path differentiating factor. Practical simulation experience has shown that this simple path likelihood metric is effective even though the approximation to the conditional probability of $P(p_k|S_m)$ is crude.

Another very important factor is that the differentiating part of the likelihood metric when the above approximation is used becomes independent of the variance of the conditional probability of $p_k$. This is a key factor in the robustness and practicality of the method.

EXAMPLE

Below there is provided a simple MatLab simulation to demonstrate the effectiveness of the present method.

In the simulation, an array of 2000 complex samples of $x_k$ were generated based on the assumption that the signal component was a constant amplitude exponential with a phase increment of 0.03 radians. Random noise was added to the samples of $x_k$ that was zero mean gaussian to both in-phase and quadrature phase components. The noise components were independent from sample to sample and also the noise in the quadrature and in-phase components were independent of each other. The variance of the noise components was selected to satisfy a given SNR of the correlation samples $x_n$ for the simulation.

The Viterbi demodulator was implemented as described above and tracked the phase excursion of the correlation samples $x_k$. The accuracy of the demodulated phase was compared to the actual phase to determine a signal loss factor that was dependent on phase errors only.

Figure 5:
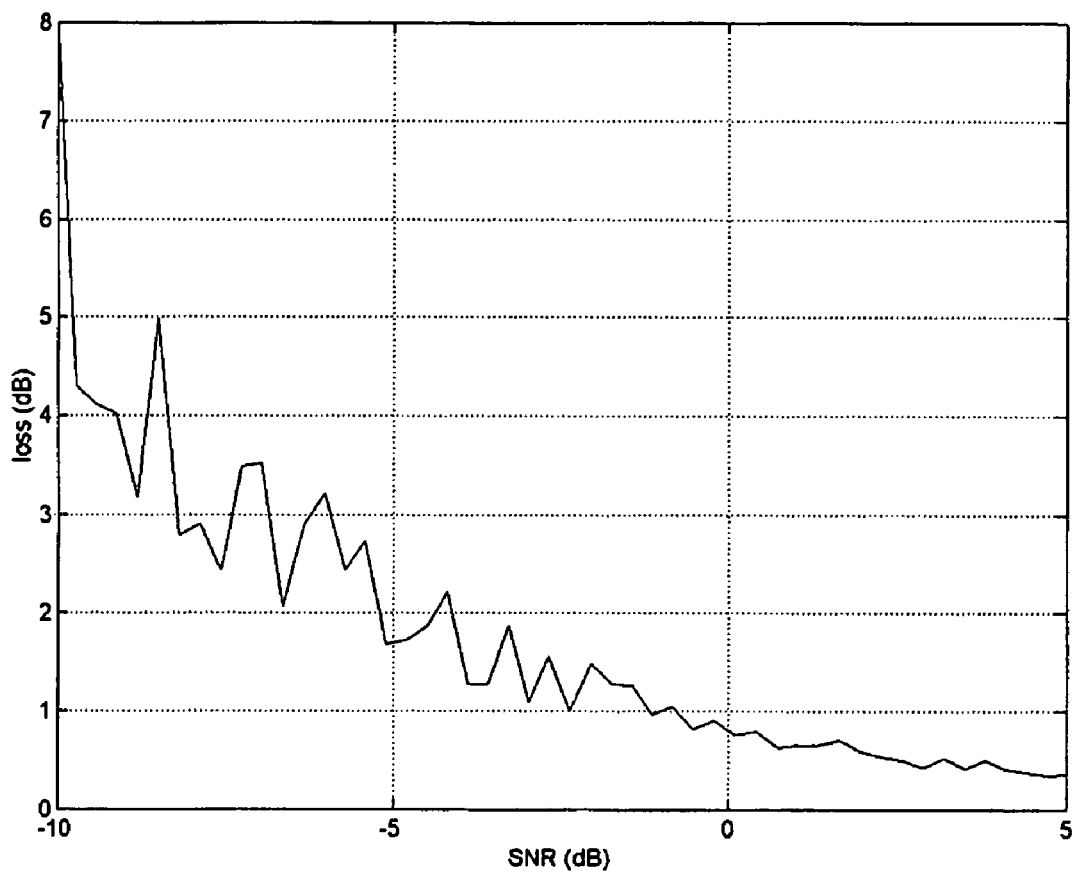
FIG. 5 is a graph illustrating the losses in decibels verses the signal to noise ratio of the samples received in decibels.

FIG. 5 shows a plot of this loss factor as a function of the SNR of the correlation samples. As expected, the loss generally decreases as a function of increased SNR. At very low SNR levels, the phase tracking becomes so erratic that the Viterbi demodulation is not effective.

FIG. 5 can be used to determine the number of samples required for a given SNR. Consider the samples at 0 dB SNR. As stated earlier, to satisfy the requirements of adequate detection and false alarm statistics, approximately 11 dB of SNR is required at the output of the overall correlation process. Hence if the samples $x_k$ of 0 dB SNR are generated after coherent correlation of $T_c$, the number of samples required, K, is given by the formula:

10 log(K)>=(Minimum Correlation Process Output SNR)−(Coherent Correlation SNR)+(coherence integration losses in dB)

or, using FIG. 5, 10 log(K)>=11−(0)+1=12 dB.

Solving this, K=16.

As indicated, the additional 1 dB added to the right hand side of the above formula is to offset the coherence integration losses represented in FIG. 5. Comparing this with the traditional scheme which uses non-coherent summation of the correlator output samples, a minimum of K=26 is required. Hence, for a given GPS hypothesis dwell time, sensitivity can be significantly better with the Viterbi style demodulator as represented in this disclosure.

Matlab Simulation Listing

```
% viterbi demodulator for phase excursion
%
% number of state transitions
K = 2000;
% number of states
M = 30;
% phase angle of each state
state_angle = (2*pi/M) * [0:M−1]';
% model the actual signal phase
phi_sig = .03 * [1:K]';
% actual signal
SNRdB = −6;
SNR = 10^(0.1*SNRdB);
u = exp(1j*phi_sig);
x = randn(K,1) + 1j*randn(K,1) + sqrt(SNR) * u;
phi_meas = angle(x);
% metric for phase state
% at each update there is only one surviving path for each
state
Mt = zeros (M,1);
% paths, and initiate the k=1 state; equal probability that we
can start from
% any state
P = zeros(M,K);
P(:,1) = [1:M]';
Pnew = P;
% loop over the overall set of K state transitions
I = ones(M,1);
for k=2:K
    % determine the path metric of the new segment from state
k−1 to state k
```

-continued

Matlab Simulation Listing

```
    g1 = phi_meas(k) * ones(M,1) – state_angle;
    g2 = g1 + 2*pi*I;
    g3 = g1 – 2 *pi*I;
    M_new = (min(abs([g1,g2,g3]'))').^2;
    % determine the new path for state m
    for m=1:M
        if m == 1
            mm1 = M;
            m0 = 1;
            mp1 = 2;
        elseif m == M
            mm1 = M–1;
            m0 = M;
            mp1 = 1;
        else
            mm1 = m–1;
            m0 = m;
            mp1 = m+1;
        end
        [g1,i] = min([Mt(mm1),Mt(m0),Mt(mp1)]);
        if i == 1
            Pnew(m,1:k) = [P(mm1,1:k–1),m];
            Mt(m) = Mt(mm1) + M_new(m);
        elseif i ==2
            Pnew(m,1:k) = [P(m0,1:k–1),m];
            Mt(m) = Mt(m0) + M_new(m);
        else
            Pnew(m,1:k) = [P(mp1,1:k–1),m];
            Mt(m) = Mt(mp1) + M_new(m);
        end
    end
    P = Pnew;
end % end of the K transition periods
figure(1);plot(P');
hold on;
[g1,i] = min(Mt);
plot(P(i,:),'or');
hold off;
% unwrap P
Puw = zeros(K,1);
Puw(1) = P(i,1);
offset = 0;
for k=2:K
    Puw(k) = P(i,k) + offset;
    if Puw(k) – Puw(k–1) > 1
        offset = offset – M;
        Puw(k) = Puw(k) – M;
    end
    if Puw(k) – Puw(k–1) < –1
        offset = offset + M;
        Puw(k) = Puw(k) + M;
    end
    if abs(Puw(k) – Puw(k–1)) > 1
        error('discontinuity in Puw');
    end
end
figure(2);
plot(Puw);
figure(3);
plot(P(i,:),'r');
hold on;
plot(mod(phi_sig * M/(2 * pi),M),'g');
hold off;
grid on;
% calculate the integration loss
Loss = 20 * log10(abs(u' * exp(1j*state_angle(P(i,:))))/K)
```

The above-described embodiments of the present invention are meant to be illustrative of preferred embodiments and are not intended to limit the scope of the present invention. Also, various modifications, which would be readily apparent to one skilled in the art, are intended to be within the scope of the present invention. The only limitations to the scope of the present invention are set forth in the following claims appended hereto.

I claim:

1. In a receiver, a method of improving sensitivity in the demodulation of a received signal by said receiver over an arbitrary measurement time epoch, said method comprising the steps of:
    correlating said received signal with a local replica of pseudo noise code in a coherent fashion over a plurality of time intervals in said time epoch creating a correlation signal;
    creating a trellis of evenly distributed phase state nodes at each time interval, said creating step comprising:
        defining a plurality of phase states representing phases evenly quantized over 0 to 360 degrees;
        defining possible state transitions from and to each phase state node;
        creating paths between phase state nodes in one time interval and phase state nodes in another time interval according to said possible state transitions;
        assigning a transition probability to each path; and
        creating a likelihood metric for each path based on a measured phase of the correlation signal and the transition probability for the path, said measured phase of the correlation signal having a random process approximated utilizing a discrete Markov process; and
    utilizing a Viterbi algorithm on said trellis to perform a maximum likelihood estimation of a phase trajectory of the correlation signal with said quantized resolution of phase states over 0 to 360° throughout the measurement time epoch.

2. The method of claim 1, wherein the Markov process is a first order Markov process.

3. The method of claim 1, wherein the possible state transitions and the probability of the paths are assigned to reflect properties of said receiver.

4. The method of claim 3 wherein the step of creating possible state transitions for each node is performed based on a known phase slew rate limitation of said receiver.

5. The method of claim 1, wherein the received signal is a direct sequence spread spectrum signal.

6. The method of claim 1, wherein the received signal is a global positioning system (GPS) coarse/acquisition L1 signal generated by a space vehicle (SV).

7. The method of claim 4, wherein the received signal is a global positioning system (GPS) coarse/acquisition L1 signal generated by a space vehicle (SV).

8. The method of claim 1 wherein the received signal is a code-division multiple access (CDMA) pilot signal.

9. The method of claim 1, wherein the likelihood metric is created based on an approximation of a probability distribution function of the phase of said correlation signal.

10. The method of claim 9, wherein the approximation is to model the probability distribution function of the phase as a periodic gaussian pulse on top of a constant function.

11. The method of claim 1 wherein said receiver is a mobile receiver.

12. A receiver for improving the sensitivity in the demodulation of a received direct sequence spread spectrum signal, said receiver comprising:
    an antenna for receiving the direct sequence spread spectrum signal;
    a downconverter for downconverting the received signal, producing a downconverted signal;
    an analog to digital converter to convert the downconverted signal to a digital signal;

a despreader for despreading and coherently correlating the digital signal to a known signal, creating a despread signal; and a processor for applying a Viterbi algorithm to a trellis created for the despread signal, the processor:
  breaking the despread signal into time intervals;
  creating the trellis of evenly distributed phase state nodes at each time interval by:
    defining a plurality of phase states representing the phases evenly quantized over 0 to 360 degrees;
    defining possible state transitions from and to each phase state node;
    creating paths between phase state nodes in one time interval and phase state nodes in another time interval according to said possible state transitions;
    assigning a transition probability to each path; and
    creating a likelihood metric for each path based on a measured phase of said despread signal and the transition probability for the path, the measured phase of the despread signal having a random process approximated by a Markov process; and
  utilizing the Viterbi algorithm on said trellis to perform a maximum likelihood estimation of a phase trajectory of the despread signal with said quantized resolution of phase states over 0 to 360° throughout the time interval.

13. The receiver of claim 12, wherein the Markov process is a first order Markov process.

14. The receiver of claim 12, wherein the received signal is a global positioning system coarse/acquisition (C/A) L1 signal generated by a space vehicle (SV).

15. The receiver of claim 12, wherein the received signal is a CDMA pilot signal.

16. The receiver of claim 12, wherein the receiver is a mobile receiver.

17. The receiver of claim 12, wherein the known signal is a GPS C/A L1 signal.

18. The receiver of claim 17, wherein the possible state transitions and the probability of the paths are assigned to reflect properties of said receiver.

19. The receiver of claim 18, wherein the possible state transitions for each node are based on a known phase slew rate limitation of said receiver.

20. The receiver of claim 14, wherein the possible state transitions for each node are based on a known phase slew rate limitation of said receiver.

21. The receiver of claim 12, wherein the likelihood metric is created based on an approximation of a probability distribution function of the phase of said despread signal.

22. The receiver of claim 21, wherein said approximation is to model the probability distribution function of the phase as a periodic gaussian pulse on top of a constant function.

23. A wireless mobile device comprising the receiver of claim 12.

* * * * *

UNITED STATES PATENT AND TRADEMARK OFFICE
CERTIFICATE OF CORRECTION

PATENT NO. : 7,599,452 B2
APPLICATION NO. : 10/534735
DATED : October 6, 2009
INVENTOR(S) : Jorgen S. Nielsen Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1098 days.

Signed and Sealed this

Twenty-eighth Day of September, 2010

David J. Kappos
*Director of the United States Patent and Trademark Office*